United States Patent [19]

Wolff

[11] 4,407,399
[45] Oct. 4, 1983

[54] TWO-SPEED TRANSMISSION WITH HYDRAULIC ACTUATION OF THE SHIFTING OPERATIONS UNDER LOAD

[75] Inventor: Friedrich Wolff, Wetter, Fed. Rep. of Germany

[73] Assignee: O&K Orenstein & Koppel Aktiengesellschaft, Berlin, Fed. Rep. of Germany

[21] Appl. No.: 230,079

[22] Filed: Jan. 26, 1981

[30] Foreign Application Priority Data

Feb. 2, 1980 [DE] Fed. Rep. of Germany ....... 3003831

[51] Int. Cl.³ .................. B60K 41/28; G05G 1/00
[52] U.S. Cl. ............................ 192/4 A; 192/12 C; 192/18 A; 74/787; 74/572
[58] Field of Search ............. 74/785, 786, 787, 572; 192/4 A, 12 C, 18 A, 3.62, 3.57, 13 R, 13 A

[56] References Cited

U.S. PATENT DOCUMENTS 4,122,926 10/1978 Spanke et al. ............... 192/18 A
4,296,650 10/1981 Kalns ........................ 192/18 A

*Primary Examiner*—George H. Krizmanich
*Attorney, Agent, or Firm*—Martin A. Farber

[57] ABSTRACT

A two-speed transmission with hydraulic actuation of the shifting operations under load for hydrostatically operated work machines, particularly caterpillar-track excavators, having a planetary gearing provided with double planet gears, and having packs of discs which are arranged coaxially around the axis of the sun gear of the planet gearing and which act as a clutch or as a brake, respectively. The planet carrier of the planetary gearing is formed as a flywheel and the shifting step of the transmission which serves for starting the work machine is shifted by means of compression springs, and the parking brake, biased by springs, connects the clutch and the brake non-rotatably relative to the housing of the transmission.

12 Claims, 1 Drawing Figure

U.S. Patent  Oct. 4, 1983  4,407,399
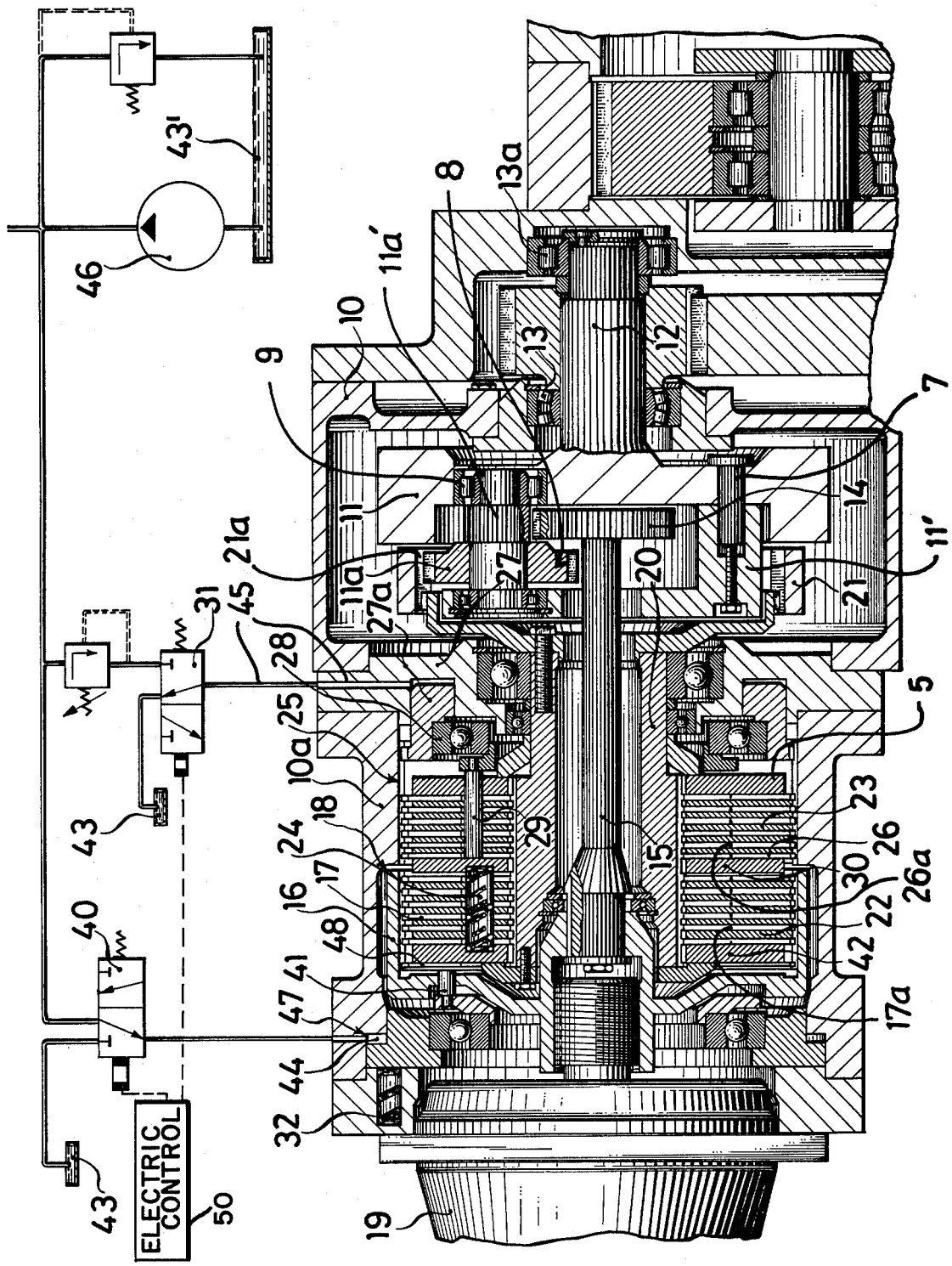

TWO-SPEED TRANSMISSION WITH HYDRAULIC ACTUATION OF THE SHIFTING OPERATIONS UNDER LOAD

The present invention relates to a two-speed transmission with hydraulic actuation of the shifting operations under load for hydrostatically operated work machines, particularly caterpillar-track excavators, with planetary gearing, double planet gears and packs of discs arranged coaxially around the axis of the sun gear and acting as a clutch or brake.

One known transmission for excavator and caterpillar-track mechanisms is provided with an oil engine equipped with constant absorption volume and with a spring-biased multiple-disc brake as a parking brake and has only one constant step-down ratio. Since the transmission is so designed that the necessary tractive force is present off the road and on gradients, forward travel over longer distances on firm, flat ground can be effected only with low speed of travel, which means a high expense of time and lack of use of the apparatus, particularly as loading onto deep-loading vehicles is not always possible or is also expensive.

In known drives for work machines of high internal resistances such as true, for instance, of caterpillar-track mechanisms of earth excavators, a large part of the torque must be applied in order to overcome the starting resistances. After these initial resistances have been overcome, the oil pressure drops upon level travel so that, in itself, it would be possible to connect a higher speed stage with a two-speed transmission. This, however, is actually very difficult since it is scarcely possible, in view of said resistances to shift the transmission under load so rapidly that the next speed is shifted before the vehicle has come to a stop as a result of these resistances, with the result that it would remain stationary.

The object of the present invention is to design a transmission which can be shifted under load in such a manner that the speed of travel is retained during the shifting process even in the case of the heaviest caterpillar-track mechanisms and that the vehicle does not come to a standstill.

This object is achieved in accordance with the invention in the manner that the planet carrier (11) of the planet gear is developed as a flywheel.

The advantage of the transmission in accordance with the invention resides in the fact that even with the heaviest caterpillar-track mechanisms there is obtained a speed of travel which corresponds to that of the normal chassis, and the vehicle can thus travel with time-saving travel speed even over longer distances.

This advantage is obtained in that the planet carrier which is formed as a flywheel disc and has double planet gears, permits smooth shiftings and such a slight drop in the speed of travel upon shifting up into second speed that the caterpillar mechanism does not come to a stop during the shifting process. A spring-biasing of the multi-disc brake for the first speed contributes to this, in combination with an electric switching of a 3/2-way directional valve for the actuation of the servomotor, the latter being fixed to the housing, permitting upon the starting operation the maximum transmission step-down ratio.

With the above and other objects and advantages in view, the present invention will become more clearly understood in connection with the detailed description of a preferred embodiment, when considered with the accompanying drawing, the only FIGURE of which is a section through the load shift transmission intended for a caterpillar-bagger or digger.

A non-rotatable housing comprising parts 10a, 10 contains the transmission. Double-planet gears 8 each comprises gear portion 11a, 11a' formed in one-piece integrally connected together. The gear portion 11a' meshes with a sun gear 14 and the gear portion 11a meshes with an annular internal gear 21 having radially inwardly directed gear teeth 21a. The gear 21 constitutes a first portion of and the gear 14 constitutes a second portion of a plantary gearing. The double-planet gears 8 are rotatably mounted at ends thereof via bearings 9 in a planet carrier 11 and a carrier 11' jointly rotatably fixed to the carrier 11 by bolts 7. The carrier 11 has a width encompassing a bearing of the planet gears and a diameter greater than the internal gear 21 so as to have a flywheel mass which permits smooth shifting and such a slight drop in the speed of travel upon shifting into second speed that the caterpillar mechanism does not come to a stop during the shifting process.

In the housing 10, the planet carrier 11, which is formed formed as a flywheel disc carrying the double planet gears 8 (11a, 11a'), is rigidly connected jointly rotatably with a driven shaft 12 which is supported in anti-friction bearings 13 and 13a. The sun gear 14, which is positioned in a space formed between the carriers 11, 11', is fixedly connected to a drive shaft 15 for joint rotation therewith. The free end of the drive shaft 15 is connected fixedly for joint rotation with a hub 16. The hub 16 extends radially outwardly and has a peripheral cylindrical portion adjacent the housing part 10a which operatively receives and mounts at its interior periphery a plurality of substantially annular outer discs 17 of a clutch 18 jointly rotatably with the hub 16. The hub 16 is rigidly connected to and rotatably driven by the oil engine 19.

An axially non-displaceable hollow shaft 20 is fixed to, and jointly rotatable with the internal gear 21 and a plurality of inner discs 22 of the clutch 18 and inner discs 23 of a brake 25, the latter being biased by compression springs 24 via a thrust disc 30. Outer discs 26 of the brake 25 are mounted non-rotatably on and relative to the housing part 10a. The construction per se of the discs 17, 22 of the clutch 18 and the discs 23, 26 of the brake 25 alternately arranged and frictionally engageable and disengageable upon axially compression and release respectively of the discs is known per se. An abutment disc 5 is provided. The discs 5 and 42 are axially limited in movement by abutment against limit stop members connected to the axially immoveable shaft 20. The annular discs 5, 42, and 30 are jointly rotatably connected with the shaft 20. The discs 5, 30, 42, 17, 22, 23, and 26 are slightly axially moveable.

The clutch 18 is acted on by pressurized oil via a piston 27a of a servomotor 27, in turn via a thrust bearing 28, thrust bolts 29 and the thrust disc 30 by means of a directional valve 31 (when switched to the right position, not as shown) and a pump 46 from supply 43'. Pressurized oil is then fed to the piston 27a through the bore 45 via the directional valve 31.

The brake 25 is actuated by the compression springs 24 and the thrust disc 30 when the directional valve 31 is actuated so as to be connected to the tank 43 in the position as shown in the drawing.

So that at times the inner discs 22 and 23, through which the compression springs 24 and the thrust bolt 29, respectively, extend, can turn relative to the outer discs, 17 and 26, respectively, the inner peripheral edge 17a and 26a of these annular outer discs are radially outwardly located relative to the springs 24 and thrust bolts 29.

The parking brake 47 which is acted on by compression springs 32 can be opened via a 3/2-way directional valve 40. When the latter is shifted to the left, not as shown, the parking brake 47 acts via thrust bolts 41, and thrust disc 42 on the discs 17, 22 of the clutch 18 (engaging the clutch 18) and on the discs 23 and 26 of the brake 25 (closing the brake 25 if the bore 45 is vented to the tank 43); it thus, connects the internal gear 21 and the sun gear 14 together with the double planet gears 8 of the planet gearing non-rotatable relative to the housing 10a. The valves 31 and 40 are electrically actuatable by an electric control 50.

The manner of operation is as follows:

In order now to actuate the first speed the directional valve 31 remains connecting bore 45 to tank 43, and the directional valve 40 is shifted to connect the pump 46 to the chamber 44 isolating the springs 32 from acting on the disc 42, whereby, the clutch 18 (disk pack 17, 22) is shifted by compression springs 24 acting on thrust disc 30 thereby releasing the clutch 18; since the brake 25 remains closed, thus, the internal gear 21 in this manner is non-rotatably connected via shaft 20, and discs 23, 26 of the brake 25 with the housing 10a so that the double planet gearing 11, 8 has the greatest step-down ratio as the planet gears 8 rotate and travel around the fixed internal gear 21. The servomotor 27, 27a is then connected via the directional valve 31 with the tank 43 (as shown).

The second speed is shifted as follows:

The servomotor 27, 27a is connected via the directional valve 31 (by moving the latter to the right) with the hydraulic system which is fed by the pump 46. The piston 27a acts, via the thrust bolts 29 and the thrust disc 30 against the compression springs 24, on the clutch 18, consisting of the pack of discs 17, 22, engaging the clutch 18 and now releasing the brake 25. In this way, the internal gear 21, by shaft 20, via the clutch 18 becomes rotatably connected to the drive shaft 15 and is accelerated to the same speed of rotation of the sun gear 14, since it now turns jointly therewith. The step-down ratio of the double planetary gearing 11, 11a, 11a' is then i=1, since the planet gears 8 now revolve once for each joint rotation of the sun gear 14 and internal gear 21 since they are thus, relatively fixed between the sun gear 14 and the internal gear teeth 21a.

In order now to apply the parking brake 47, the directional valve 40 is shifted to the left (not shown) in such a manner that the chamber 44 is connected with the tank 43. The compression springs 32 act via the thrust bolts 41 and outer discs 48 on the clutch 18 and the brake 25 engaging them while the bore 45 is connected to the tank 43. In this way, the internal gear 21 and the sun gear 14 of the double planetary gearing 11, 8 are connected with the housing 10a and the braking process commences, that is, the initial inertia of the rotating drive shaft 15 and shaft 20 are quickly braked to a stop by relative braking and deceleration of the rotation of the discs 23 against the fixed discs 26, whereby the discs 23 come to stop by the action of the brake discs 26.

|  | Valve 40 connected to: | Valve 31 connected to: | Clutch 18 | Brake 25 |
|---|---|---|---|---|
| Parking brake 47 applied | tank 43 | tank 43 | engaged (by spring 32 overcoming spring 24) | closed (by spring 24) |
| 1st speed | pump 46 | tank 43 | disengaged (by spring 24 and non-action of springs 32) | closed (by spring 24) |
| 2nd speed | pump 46 | pump 46 | engaged (by pressurized oil force overcoming spring 24; spring 32 non-active) | open (oil pressure overcomes spring 24) |

I claim:

1. In a two-speed transmission with hydraulic actuation of the shifting operations under load for a hydrostatically operated work machine, particularly caterpillar-track excavators, having a planetary gearing provided with double planet gears, a sun gear as an input member, and a brakable internal gear as a reaction member, and having packs of discs forming a clutch constituting a clutch means and a brake constituting a brake means, respectively, which discs are arranged coaxially around the axis of the sun gear of the planetary gearing, the improvement wherein said packs of discs formed as said clutch means and said brake means, respectively, for being operatively connected to said planetary gearing, said planetary gearing includes a planet carrier means for carrying the planet gears via a bearing of the latter and for being continuously connected with a power take-off, and said planet carrier means has a width encompassing the bearing of the planet gears and a diameter greater than the internal gear so as to be formed as a flywheel.

2. The two-speed transmission as set forth in claim 1, further comprising a housing in which the transmission is disposed, a drive shaft operatively connected to first of said discs of said clutch, said planetary gearing includes a first portion operatively connected to second of said discs of said clutch and to first of said discs of said brake, second of said discs of said brake are non-rotatably secured to said housing, said planetary gearing includes a second portion connected to said drive shaft, said double planet gears meshingly engage said first portion and said second portion of said planetary gearing, said first and second discs of said clutch constitute means for being operatively jointly connected when said clutch is engaged, said first and second discs of said brake constitute means for being operatively jointly connected when said brake is closed, and a driven shaft jointly rotatably connected to said flywheel and the power take-off.

3. The two-speed transmission as set forth in claim 2, wherein said first portion of said planetary gearing is a cylindrical said interior gear, said second portion of said planetary gearing is said sun gear, each said double planet gears includes a one-piece formation of a first gear engaging said sun gear and a second gear engaging said interior gear.

4. The two-speed transmission as set forth in claim 2, further comprising a hollow shaft is secured to said first portion of said planetary gearing and connected jointly rotatably with said second discs of said clutch and said first discs of said brake, said first discs of said brake and said second discs of said clutch extend annularly outwardly from said hollow shaft, said hollow shaft is axially fixed and relatively rotatably mounted to and on said drive shaft, a hub is jointly rotatably mounted to said drive shaft and has a cylindrical peripheral portion spaced radially outwardly from said hollow shaft, said first discs of said clutch are connected jointly rotatably with and extend annularly inwardly from said peripheral portion of said hub.

5. The two-speed transmission as set forth in claim 1 or 2, further comprising means comprising compression springs for shifting a shifting step of the transmission, which shifting step serves for operatively starting the work machine, a housing in which said transmission is disposed, a parking brake means for selectively connecting said clutch and said brake non-rotatably relative to the housing, said means comprising said compression springs further are for axially operatively acting on said discs of said brake for closing said brake and for axially operatively acting on said discs of said clutch for disengaging said clutch in a first speed condition of the transmission constituting said shifting step serving for starting the work machine, said spring means further for axially operatively acting on said discs of said clutch for engaging the latter overcoming the action of said compression springs on said clutch in a parking brake condition of the transmission, said means comprising said compression springs for operatively acting on said discs of said brake for closing said brake in said parking brake condition, first hydraulic pressurized means for selectively operatively acting on said brake for opening said brake overcoming the action of said compression springs on said brake and simultaneously for axially operatively acting on said discs of said clutch for engaging said clutch overcoming the action of said compression springs on said clutch in a second speed condition of the transmission, said parking brake means comprises second hydraulic pressurized means for selectively isolating said spring means from acting on said clutch in the first and second speed conditions.

6. The two-speed transmission as set forth in claim 5, further comprising a first thrust disc engaging one axial end side of said discs of said clutch, a second thrust disc operatively engaging and disposed between one axial end side of said discs of said brake and the other axial end side of said discs of said clutch, said compression springs are disposed between and engage facing sides of said first and said second thrust discs, an abutment disc abutting the other axial end side of said discs of said brake, said first hydraulic pressurized means includes thrust bolts extending through said abutment disc and adjacent said discs of said brake and engaging another side of said second thrust disc, said spring means for operatively acting on another side of said first thrust disc selectively via said second hydraulic pressurized means.

7. The two-speed transmission as set forth in claim 5, further comprising a hydraulic pump and a tank, said first hydraulic pressurized means includes a first directional valve means and a first piston on one side thereof operatively engaging said compression springs and on another side thereof communicating with said first directional valve means, said second hydraulic pressurized means includes a second directional valve means and a second piston on one side operatively engaging said spring means and on another side thereof communicating with said second directional valve means, and thrust bolts adjacent said another side of said second piston and operatively engaging one axial end side of said clutch, said pistons are mounted in said housing, said first and second directional valve means are electrically actuatable and for respectively cooperatively selective connection to said hydraulic pump and to said tank, respectively, so as to provide said parking brake condition, said first speed condition and said second speed condition, respectively.

8. The two-speed transmission as set forth in claim 1, further comprising means comprising compression springs for shifting a shifting step of the transmission, which shifting step serves for operatively starting the work machine, a housing in which said transmission is disposed, a parking brake means for selectively connecting said clutch and said brake non-rotatably relative to the housing, a drive shaft connected to a portion of said clutch and to a portion of said planetary gearing, a driven shaft jointly rotatably connected to said flywheel and to said power take-off, said portion of said clutch and a portion of said brake are connected to another portion of said planetary gearing, another portion of said brake is connected to said housing, means including said compression springs, said parking brake means including said spring means for shifting, selectively:

engaging said clutch and closing said brake in a parking brake condition for the connection of said clutch and said brake non-rotatably relative to said housing;

disengaging said clutch and closing said brake in a first speed condition of the transmission constituting said shifting step serving for starting the work machine; and engaging said clutch and opening said brake in a second speed condition.

9. The two-speed transmission as set forth in claim 1, further comprising means comprising compression springs for shifting a shifting step of the transmission, which shifting step serves for operatively starting the work machine.

10. The two-speed transmission as set forth in claim 1, further comprising a housing in which said transmission is disposed, a parking brake means for selectively connecting said clutch and said brake non-rotatably relative to the housing.

11. The two-speed transmission as set forth in claim 10, wherein said parking brake means includes spring means for operatively biasing said parking brake means.

12. The two-speed transmission as set forth in claim 1, wherein said planet carrier means includes, a flywheel disc formed with a peripheral axially projecting annular flange having an outer cylindrical surface of a diameter greater than an outermost diameter of said internal gear, a carrier having a disc portion and an axially projecting annular segment flange with an outer diameter substantially equal to the inner diameter of said peripheral axially projecting annular flange of said flywheel disc, said segment flange projects toward the flywheel disc with said flanges overlapping and defining a space between said flywheel disc and said disc portion of said carrier, said sun gear and said planet gears are disposed in said space, said bearing of said planet gears is mounted in said flywheel disc, and a corresponding opposite bearing of said planet gears is mounted in said disc portion of said carrier, and means disposed in at least one of said flanges for connecting said flywheel disc and said carrier for joint rotation.

* * * * *